(12) United States Patent
Yamaguchi et al.

(10) Patent No.: US 6,672,433 B2
(45) Date of Patent: Jan. 6, 2004

(54) BRAKE LINING OF BRAKE DEVICE

(75) Inventors: Masato Yamaguchi, Tokyo (JP); Yukio Takai, Tochigi (JP); Hidetoshi Suzuki, Kanagawa (JP); Hideto Murakami, Kanagawa (JP); Takahiro Mibe, Kanagawa (JP); Takeshi Ito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/290,248

(22) Filed: Nov. 8, 2002

(65) Prior Publication Data

US 2003/0106749 A1 Jun. 12, 2003

(30) Foreign Application Priority Data

Dec. 7, 2001 (JP) ........................................ 2001-374477

(51) Int. Cl.$^7$ .............................................. F16D 69/00
(52) U.S. Cl. .............................. 188/251 A; 188/251 M; 188/250 G; 188/250 B
(58) Field of Search ........................ 188/250 R, 251 R, 188/255, 257, 251 A, 251 M, 250 G, 250 B, 73.1, 250 E

(56) References Cited

U.S. PATENT DOCUMENTS

| | | | | |
|---|---|---|---|---|
| 3,791,493 A | * | 2/1974 | Yamaguchi et al. | ... 188/251 M |
| 4,994,506 A | * | 2/1991 | Anton et al. | ................. 523/155 |
| 5,048,654 A | * | 9/1991 | Yesnik | ..................... 192/70.14 |
| 5,268,398 A | * | 12/1993 | Nakagawa et al. | ......... 523/158 |
| 6,231,977 B1 | * | 5/2001 | Suzuki et al. | ............... 428/375 |
| 6,265,066 B1 | * | 7/2001 | Suzuki et al. | ............... 428/391 |
| 2001/0027073 A1 | * | 10/2001 | Kobayashi et al. | ......... 442/130 |
| 2002/0185346 A1 | * | 12/2002 | Hays | ..................... 188/251 A |

FOREIGN PATENT DOCUMENTS

| | | | |
|---|---|---|---|
| JP | 5306725 | * | 5/1993 |
| JP | 1089391 | * | 4/1998 |

* cited by examiner

Primary Examiner—Christopher P. Schwartz
Assistant Examiner—Devon Kramer
(74) Attorney, Agent, or Firm—Foley & Lardner

(57) ABSTRACT

A brake lining of a vehicular brake device is produced by a friction material which has a characteristic that a friction coefficient of the friction material decreases according to an increase of a sliding speed between the brake lining and a rotational member when the sliding speed is greater than or equal to a predetermined speed during the braking operation, and the friction coefficient is substantially constant when the sliding speed is smaller than the predetermined speed.

8 Claims, 6 Drawing Sheets

BRAKE LINING OF BRAKE DEVICE

BACKGROUND OF THE INVENTION

The present invention relates to a brake lining for a vehicular brake device such as a disc brake and a drum brake.

Various brake linings performing various characteristics have been proposed and in practical use. One typical brake lining employs a fiction material, which performs a characteristic that a friction coefficient decreases as a sliding speed between the brake lining and a rotational member of a brake device increases. Another type brake lining employs a friction material, which performs a characteristic that a friction coefficient increases as the sliding speed increases within a low-speed range of the sliding speed and that the friction coefficient is almost constant in a high-speed range of the sliding speed.

SUMMARY OF THE INVENTION

However, the former brake lining has been yet required to suppress noise and vibration of a brake device just before vehicle stops, and the latter brake lining has been yet required to improve a feeling during the braking operation.

It is therefore an object of the present invention to provide an improved brake lining which is capable of realizing a suitable feeling in a braking operation and of avoiding the generation of vibrations and noises of a brake device during the braking operation.

An aspect of the present invention resides in a brake lining which is of a vehicular brake device for executing a braking operation by forcing the brake lining into friction contact with a rotational member and which comprises a friction material having a characteristic that a friction coefficient of the friction material decreases according to an increase of a sliding speed between the brake lining and the rotational member when the sliding speed is greater than or equal to a predetermined speed during the braking operation, and the friction coefficient is substantially constant when the sliding speed is smaller than the predetermined speed.

The other objects and features of this invention will become understood from the following description with reference to the accompanying drawings.

DETAILED DESCRIPTION OF THE INVENTION

Figure 1:
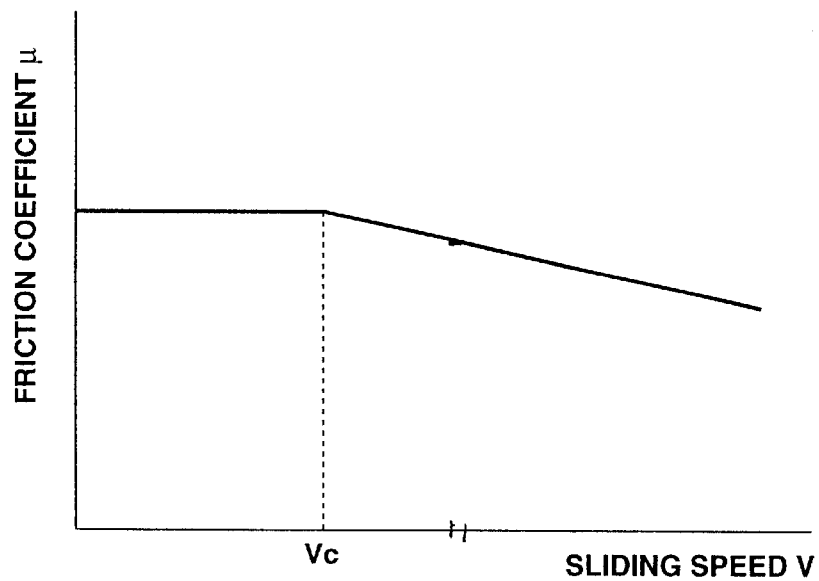
FIG. 1 is a graph showing a relationship between a sliding speed and a friction coefficient of a friction material employed in a brake lining of a brake device in according with the present invention.

Referring to the drawings, there will be discussed a preferred embodiment of a brake lining according to the present invention.

FIG. 1 shows a relationship between a sliding speed and a friction coefficient of a friction material employed as the brake lining of a vehicular brake device in accordance with the present invention. Herein, sliding speed V is a speed of a rotational member (disc rotor or brake drum) in a case that the rotational member slides on the brake lining (friction element) while being forced into frictional contact with the brake lining.

As shown in FIG. 1, the friction material employed as the brake lining has a characteristic that the friction coefficient $\mu$ is kept at about the same value when sliding speed V is within a range from 0 to a predetermined value $V_c$, and friction coefficient $\mu$ decreases according to an increase of sliding speed V when sliding speed V is greater than the predetermined value $V_c$. Herein, the predetermined value $V_c$ is a speed at which the brake device generates a self-excited vibration. By employing the friction material performing the above-discussed characteristic as the brake lining, when the braking operation is executed, a deceleration is increased under a condition that a depressing force onto a brake pedal is constant. Therefore, at a moment just before the vehicle is stopped, that is, when sliding speed V takes predetermined value $V_c$, the deceleration increases without increasing a depression degree of the brake pedal. This realizes a braking operation feeling of being safe for the driver. Simultaneously, since the friction coefficient takes about the same value at the moment just before the vehicle is stopped, it becomes possible to suppress the generation of the self-excited vibration and the noise due to this vibration.

Figure 2:
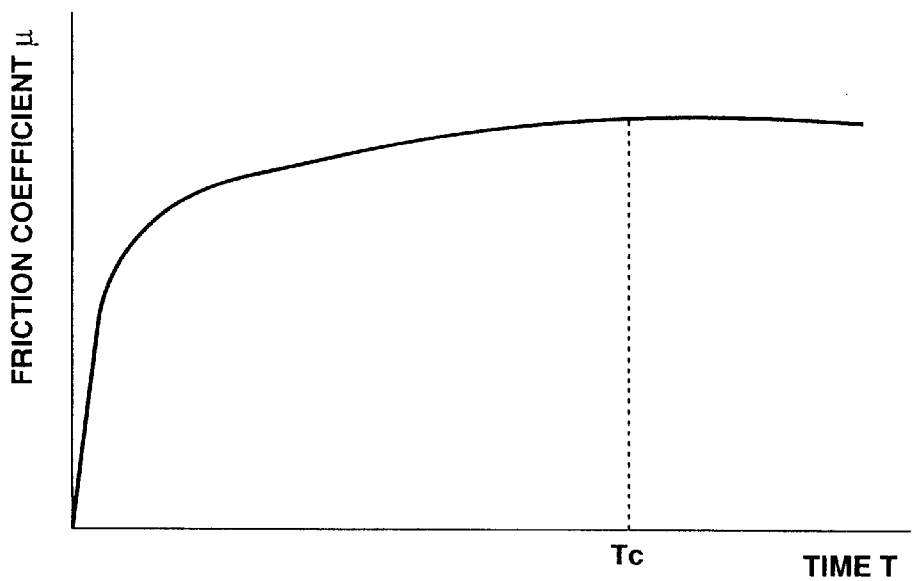
FIG. 2 is a graph showing a change of the friction coefficient of the friction member according to the elapsed time in a case that the braking is executed at a constant depression force onto a brake pedal using the brake device of employing the friction member of FIG. 1.

FIG. 2 shows a graph representative of a change of the friction coefficient of the friction material of the brake lining according to the elapsed time in the event that the braking is executed by applying a constant braking depressing force to the brake pedal, in a case that the brake device employs the friction material of FIG. 1 into the brake lining.

As clearly shown in FIG. 2, friction coefficient $\mu$ suddenly rises just after the driver depresses the brake pedal, and friction coefficient $\mu$ then slowly rises according to the elapse time until the elapsed time becomes a time $T_c$. Thereafter, friction coefficient $\mu$ maintains about the same value. Herein, time $T_c$ is a time when sliding speed V takes the predetermined value $V_c$.

Figure 3:
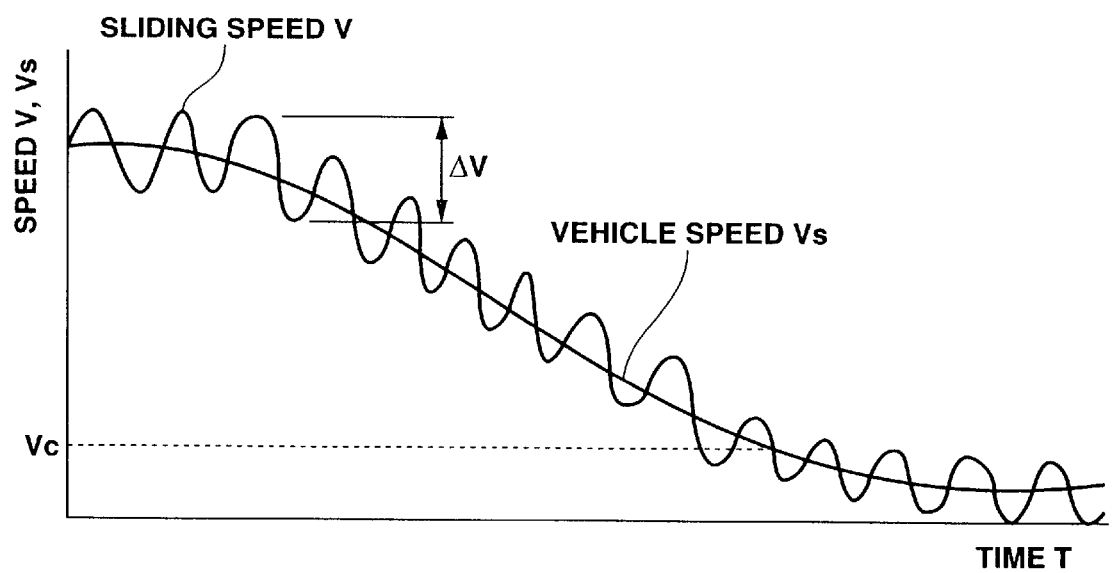
FIG. 3 is a graph showing changes of a vehicle speed and the sliding speed according to the elapsed time during the braking operation.

FIG. 3 is a graph showing changes of vehicle speed $V_s$ and sliding speed V according to the elapsed time under the condition of FIG. 2. As is clear from FIG. 3, from a moment when the driver depresses the brake pedal, vehicle speed $V_s$ decreases according to the elapsed time in the curve shown in FIG. 3. On the other hand, sliding speed V decreases while vibrating with an amplitude ΔV. Herein, when a difference $V_s-\Delta V$ between vehicle speed $V_s$ and amplitude ΔV becomes smaller than zero ($V_s-\Delta V<0$), the self-excited vibration generated in the brake device increases, and the noise due to this self-excited vibration also increases. Therefore, friction coefficient μ is kept almost at a constant value so as to suppress the self-excited vibration of the brake device and to prevent the generation of the noise due to the self-excited vibration, after the moment when the difference $V_s-\Delta V$ becomes zero, that is, when the vehicle speed $V_s$ reaches the predetermined value $V_c$.

Figure 4:
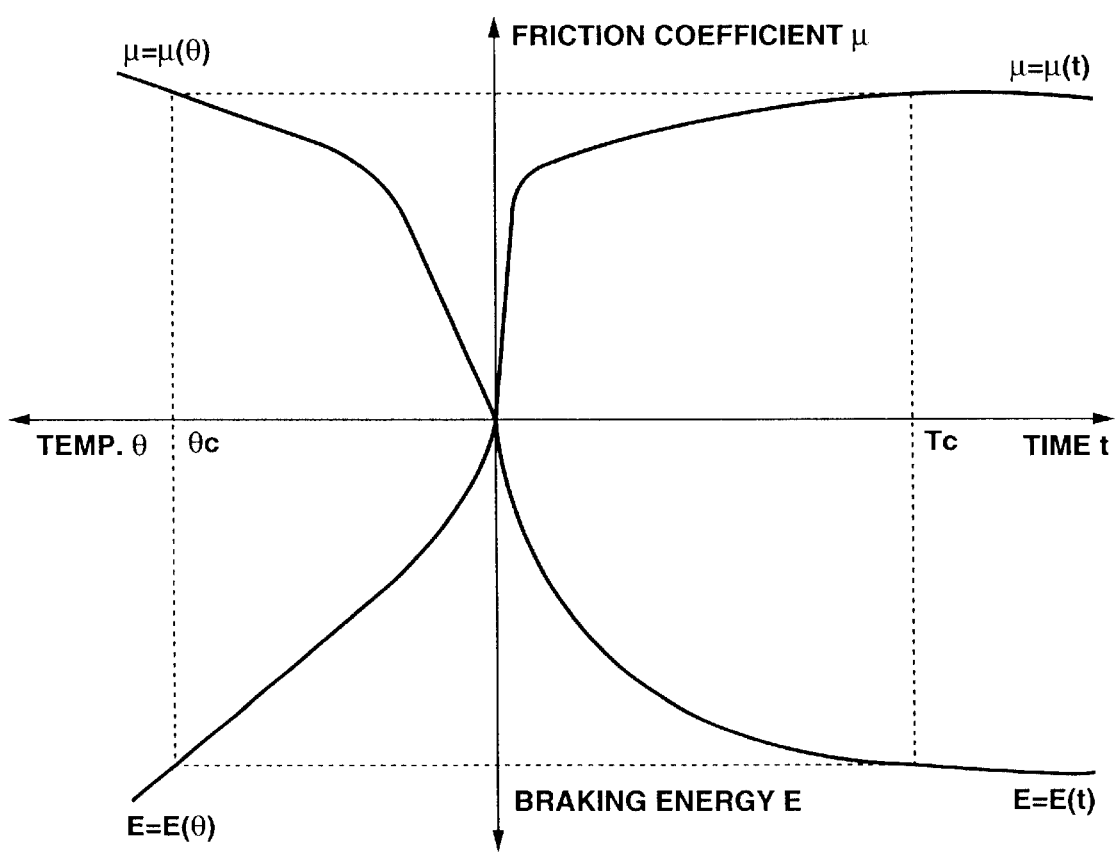
FIG. 4 is a graph showing changes of braking energy according to the elapsed time and to a change of temperature, and a change of the friction coefficient according to a change of temperature, in addition to the characteristic curve in FIG. 2.

FIG. 4 is a graph showing changes of braking energy E according to the elapsed time and to a change of temperature, and a change of friction coefficient μ according to a change of temperature, in addition to the characteristic curve in FIG. 2. Herein, braking energy E is a total quantity of energy absorbed by the brake device during the elapsed time. FIG. 4 clearly shows that these relationships are interconnected with each other. That is, the relationship between braking energy E and friction coefficient μ of the friction material of the brake lining may be designed such that friction coefficient μ increases until braking energy E reaches a predetermined value, and that friction coefficient μ becomes constant when braking energy E becomes greater than the predetermined value.

Although it is preferable that the brake lining (friction member) according to the present invention employs a single kind of the friction material, the aimed characteristic of the friction member may be obtained by combining the plural kind of friction materials which performs different characteristics, respectively.

Figure 5A:
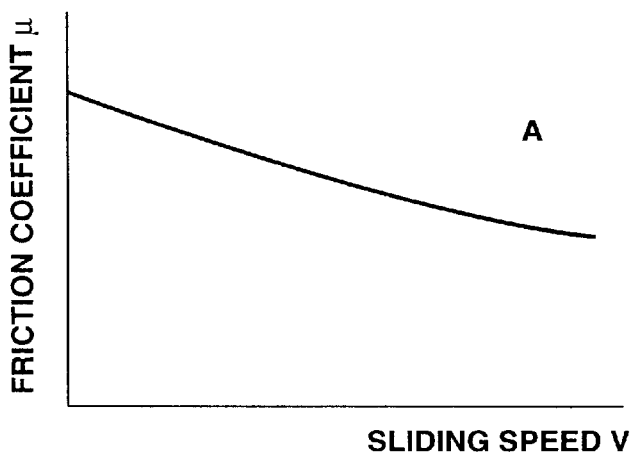
FIGS. 5A through 5C are graphs for explaining a combination of two friction materials to obtain an aimed characteristic of the friction coefficient of the friction material employed as a brake lining.
Figure 5B:
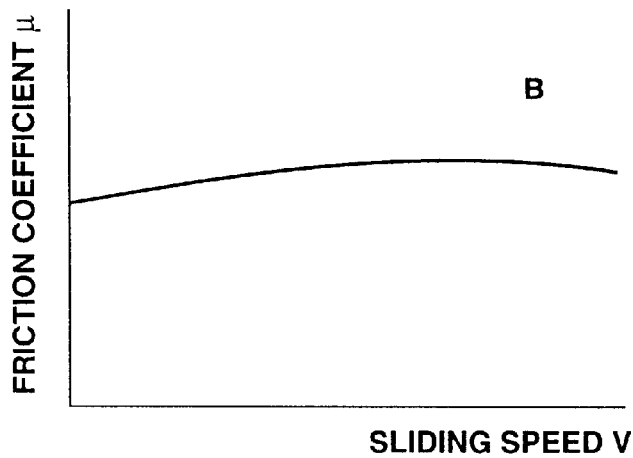
Figure 5C:
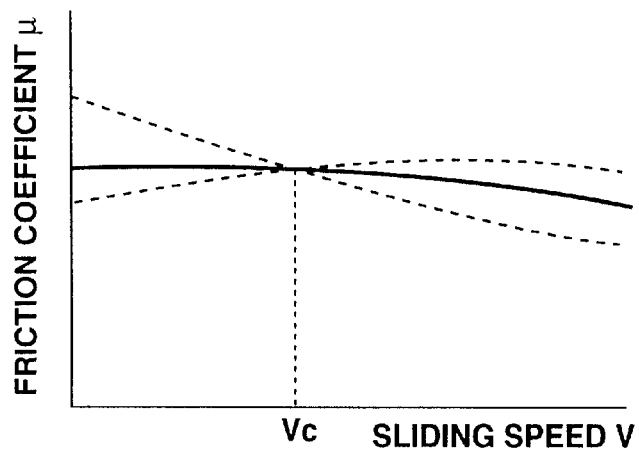

Referring to FIGS. 5A through 5C, there will be discussed a combination of different friction materials, which combination achieves an aimed characteristic of the friction coefficient relative to sliding speed V. FIG. 5A shows a characteristic of a first friction material A wherein friction coefficient μ decreases according to the increase of sliding speed V. More specifically, friction coefficient μ increases according to the deceleration of the vehicle. On the other hand, FIG. 5B shows a characteristic of a second friction material B wherein friction coefficient μ takes about the same value when sliding speed V is greater than a predetermined value, and friction coefficient μ increases according to the increase of sliding speed V when sliding speed V is smaller than the predetermined value.

By combining first friction material A and second friction material B, the characteristic shown by a continuous line in FIG. 5C is obtained. More specifically, the combination of first and second friction materials A and B performs the characteristic that friction coefficient μ takes about the same value when sliding speed V ranges from 0 to the predetermined value $V_c$, and friction coefficient μ decreases according to the increase of sliding speed V when sliding speed V is greater than or equal to the predetermined value $V_c$. It will be understood that it is necessary to select the friction materials so that the characteristic curves of the first and second friction materials intersect at the predetermined value $V_c$.

FIGS. 6A through 6D show various arrangements of the above-discussed first and second friction materials A and B employed as a brake lining (brake pad) of a disc brake.

Figure 6A:
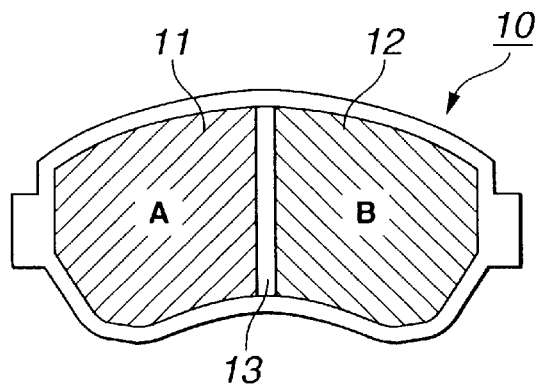
FIGS. 6A through 6D are views showing various arrangements of the two friction materials employed as a brake pad of a disc brake.

FIG. 6A shows an arrangement of a brake pad 10 of the disc brake, wherein brake pad 10 is constituted by first and second friction materials A and B. Brake pad 10 is constructed by arranging a first friction member 11 of first friction material A and a second friction member 12 of second friction material B side by side while having a clearance 13 between first and second friction members 11 and 12. By this arrangement of first and second friction members 11 and 12, the disc brake employing this brake pad 10 performs the characteristic shown by FIG. 5C.

Figure 6B:
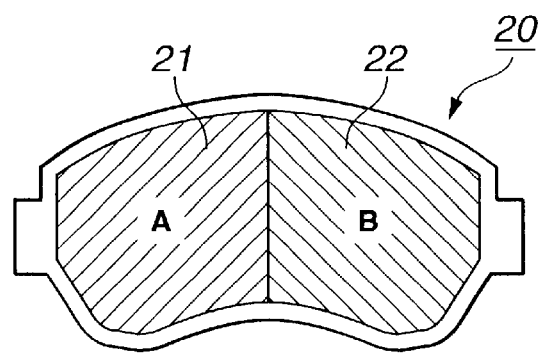

FIG. 6B shows another arrangement of first and second friction materials A and B as a brake pad 20 of the disc brake in accordance with the present invention. Brake pad 20 is constructed by arranging a first friction member 21 of first friction material A and a second friction member 22 of second friction material B side by side, as is similar to the arrangement of FIG. 6A although there is no clearance between first and second friction members 21 and 22. That is, first and second friction members 21 and 22 are integrally arranged. By this arrangement, the desired characteristic of brake pad 20 is further firmly obtained.

Figure 6C:
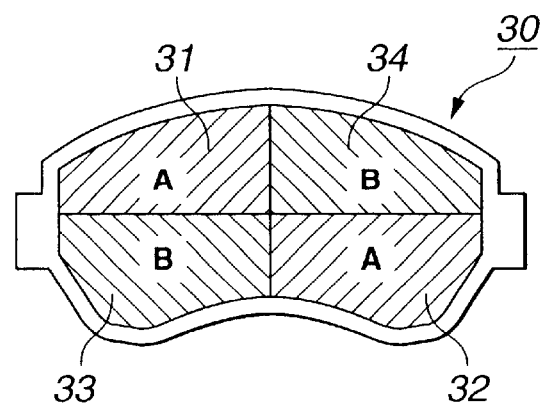

FIG. 6C shows another arrangement of first and second friction materials A and B as a brake pad 30 of the disc brake in accordance with the present invention. Brake pad 30 is constructed by arranging two friction members 31 and 32 of first friction material A and two friction members 33 and 34 of second friction material B checkerwise as is clearly shown in FIG. 6C.

Figure 6D:
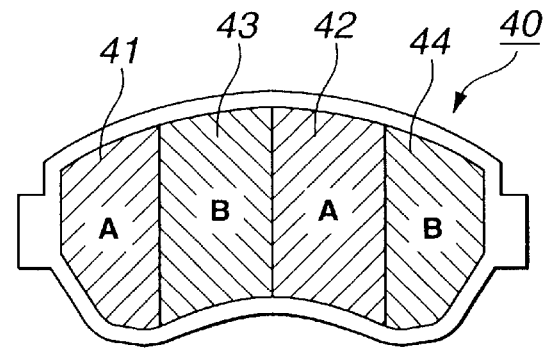

FIG. 6D shows a further another arrangement of first and second friction materials A and B of a brake pad 40 of the disc brake in accordance with the present invention. Brake pad 40 of this arrangement of FIG. 6D is constructed by two friction members 41 and 42 of the first friction material A and two friction members 43 and 44 of the second friction material B by alternately arranging two kinds of friction material. More specifically, as is clearly shown in FIG. 6D, friction members 41 through 44 are arranged in the order of 41, 43, 42 and 44. By this arrangement, the desired characteristic of the brake pad is further firmly obtained.

Figure 7:
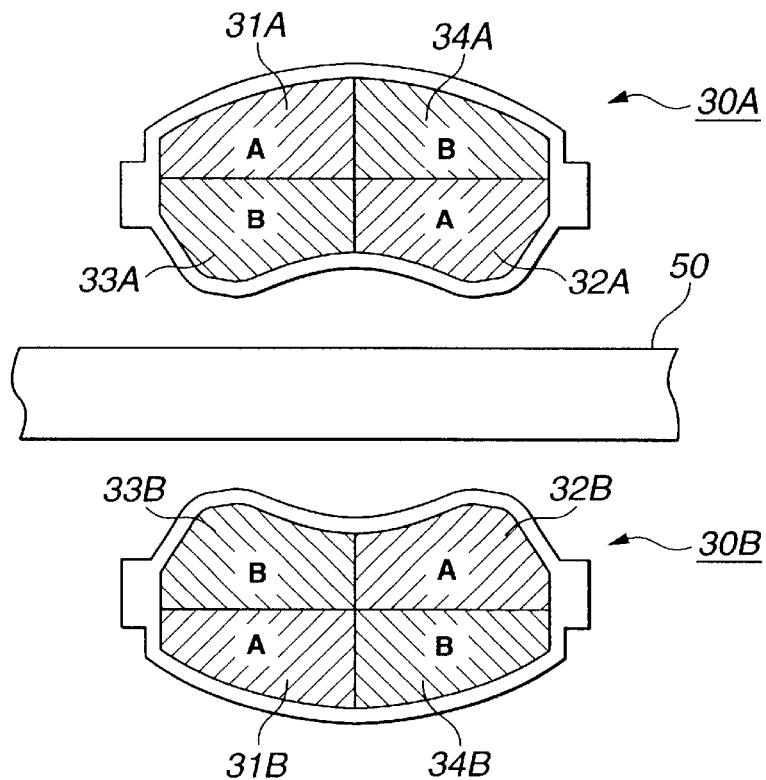
FIG. 7 is a developed view showing a positional relationship of a pair of the brake pads and a disc rotor in a disc brake in case that the arrangement of FIG. 6c is adapted thereto.

When the thus arranged brake pads particularly brake pads 30 are employed in the brake device, a pair of brake pads 30A and 30B are used in each brake device for each wheel. Brake pads 30A and 30B are positioned on the two sides of a disc rotor (rotational member) 50. Two brake pads 30A and 30B are arranged such that the friction members of the same friction material are oppositely disposed as shown in FIG. 7. By this arrangement of brake pads 30A and 30B onto respective shoes of each brake device, each brake device properly executes the aimed braking operation. If the different friction materials A and B are oppositely disposed in the respective brake pads, there is a possibility that undesired vibration is generated by the unbalance of the friction force and that the brake lining is worn on one side.

Herein, first friction material 31A of brake pad 30A and the first friction material 31B of brake pad 30B are oppositely disposed while disc rotor 50 is located between brake pads 30A and 30B. First friction material 32A of brake pad 30A and first friction material 32B of brake pad 30B are oppositely disposed while disc rotor 50 is located between brake pads 30A and 30B. Second friction material 33A of brake pad 30A and second friction material 33B of brake pad 30B are oppositely disposed while disc rotor 50 is located between brake pads 30A and 30B. Second friction material 34A of brake pad 30A and first friction material 34B of brake pad 30B are oppositely disposed while disc rotor 50 is located between brake pads 30A and 30B. That is, friction materials A and B of brake pads 30a and 30B are put in a same-material-opposed arrangement where the same material portions of brake pad 30A are faced with the same material portions of brake pad 30B.

Figure 8A:
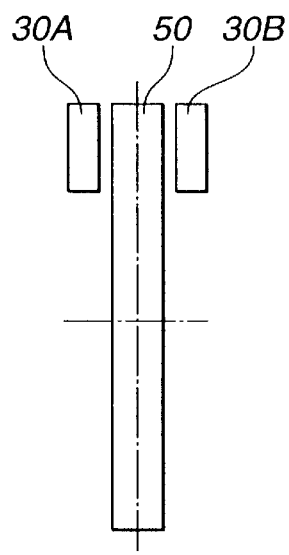
FIGS. 8A and 8B are explanatory views explaining advantages of the arrangement in FIGS. 6A through 6D.
Figure 8B:
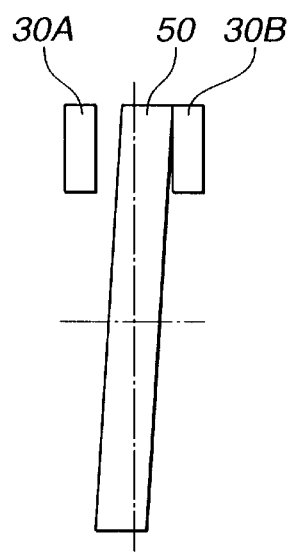

With reference to FIGS. 8A and 8B, there will be discussed the reason for arranging the friction materials as discussed above.

When the braking is not executed or when the braking has just been finished, disc rotor 50 is positioned at a neutral position between two brake pads 30A and 30B as shown in FIG. 8A. However, if the different friction materials are oppositely disposed, disc rotor 50 may be deformed by biased heating due to the unbalance of the friction force, as shown in FIG. 8B, and consequently there is a possibility that the braking device cannot perform the desired braking characteristic in the braking operation. In order to avoid such a problem, the friction materials are arranged as shown in FIG. 7.

It will be understood that the present invention is not limited to the above-discussed arrangements, and the brake pads (brake linings) may be constructed by combining three or more kinds of friction materials. Further, although the embodiment according to the present invention have been shown and described such that the friction material having the desired characteristic is adapted to the brake pad of the disc brake, it will be understood that the friction material may be adapted to a brake shoe of a drum brake.

This application is based on Japanese Patent Application No. 2001-374477 filed on Dec. 7, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A brake lining of a vehicular brake device, the brake device executing a braking operation by forcing the brake lining into friction contact with a rotational member, the brake lining comprising:

a friction material having a characteristic that a friction coefficient of the friction material decreases according to an increase of a sliding speed between the brake lining and the rotational member when the sliding speed is greater than or equal to a predetermined speed during the braking operation, and the friction coefficient is substantially constant when the sliding speed is smaller than the predetermined speed wherein the predetermined speed is a speed at which a self-excited vibration of the brake device is generated.

2. The brake lining as claimed in claim 1, wherein a desired characteristic of the friction material is achieved by a combination of at least two frictional materials which are different in the characteristic of the friction coefficient relative to the sliding speed.

3. The brake lining as claimed in claim 2, wherein the at least two friction materials are arranged such that the rotational member always frictionally slides on the brake lining when the braking operation is being executed.

4. The brake lining as claimed in claim 2, wherein the brake device includes a disc brake which produces a braking force by a clamping action of a pair of the brake linings to the rotational member.

5. The brake lining as claimed in claim 4, wherein first and second friction materials are formed into first friction members and second fiction members, respectively, and the first and second friction members are arranged side by side alternately.

6. The brake lining as claimed in claim 4, wherein first and second friction materials are formed into first friction members and second fiction members, respectively, and the first and second friction members are arranged checkerwise.

7. The brake lining as claimed in claim 1, wherein the friction material is produced by a combination of first and second friction materials, the first material having a characteristic that a friction coefficient of the first friction material decreases according to an increase of the sliding speed, the second friction material having a characteristic that a friction coefficient of the second friction material takes about the same value when sliding speed is greater than a predetermined value and the friction coefficient of the second friction material increases according to the increase of the sliding speed when the sliding speed is smaller than the predetermined value.

8. A disc brake of a vehicle, comprising:

a disc rotor; and a pair of bake pads forced into friction contact with the disc rotor, the brake pads being constructed by a friction material which has a characteristic that a friction coefficient of the friction material decreases according to an increase of a sliding speed between the brake pads and the rotor when a sliding speed is greater than or equal to a predetermined speed during a braking operation, and the friction coefficient is substantially constant when the sliding speed is smaller than the predetermined speed wherein the predetermined speed is a speed at which a self-excited vibration of the brake device is generated.

\* \* \* \* \*